July 22, 1958  J. E. GANDY  2,843,928

METHOD OF MAKING AN EXPANDABLE FASTENER

Filed Oct. 27, 1954

INVENTOR
John E. Gandy
his attorneys

United States Patent Office 2,843,928
Patented July 22, 1958

2,843,928

METHOD OF MAKING AN EXPANDABLE FASTENER

John E. Gandy, New Brighton, Pa., assignor to Townsend Company, New Brighton, Pa., a corporation of Pennsylvania Application October 27, 1954, Serial No. 465,071

2 Claims. (Cl. 29—556)

This invention relates to a method of making an expandable fastener of the type having a slotted end and an opening at the opposite end receiving an expander pin which is driveable toward the slotted end to expand outwardly the portions of the fastener intermediate the slots.

In my copending application Serial No. 452,500, filed August 27, 1954, now abandoned and superseded by my copending application Serial No. 629,320, filed December 19, 1956, I have disclosed and claimed an improved expandable fastener of the type above mentioned. That fastener has important advantages over prior fasteners of the same type as explained in my copending application, certain of the advantages deriving from an improved method of manufacture which is the subject of the present application. By my improved method of manufacture I produce a superior fastener at greatly reduced cost.

It has been customary to provide the slots in expandable fasteners of the type above referred to by sawing. Sawing is an expensive operation and has a number of disadvantages both in the making of the fasteners and in the fasteners themselves. A substantial amount of the material of which the fasteners are made is lost in saw dust. That loss becomes substantial when it is realized that fasteners of the type in question are made and used by the millions. Also, when the slots are sawed the prongs formed by the sawing operation tend to spread somewhat. Since it is important that the fastener shank be of substantially uniform transverse dimension, or at least of no greater dimension at the slotted end than beyond that end, it has often been necessary to introduce a step following the sawing operation to press the prongs inwardly to size the slotted end of the fastener. That operation has further materially increased the cost of the fastener.

Moreover, for certain uses the fasteners, or the slotted blanks which are used to make the fasteners, are heat treated and the heat treatment may have a tendency to cause the prongs to expand slightly, making it difficult to insert the fasteners into drilled holes of proper diameter to receive perfect fasteners. Such expansion of the prongs may at times cause rejection of the fasteners, especially in cases in which they are to be used for precision work.

I have obviated all of the above mentioned disadvantages of fasteners of the type in question with the results of materially decreased cost of manufacture and the production of a superior product. I provide for die-forming, preferably cold, the slots in the fastener. Thus I eliminate the waste of material in saw dust and greatly speed up the operation. By die-forming the slots I can make the slots relatively wide at the transverse outer surface of the shank and relatively narrow inwardly of such surface which has the very important advantage of increasing the spread of the prongs when the expander pin is driven home. When the slots are sawed they are of uniform width completely through the fastener and the inner portions of the prongs are spaced apart a distance equal to the thickness of the slots. By making the slots relatively wide at the transverse outer surface of the fastener and relatively narrow inwardly of such surface the inner portions of the prongs of the fastener before the expander pin is driven home are closer together. The result is that when the expander pin is driven home the outward movement of each prong is greater than when the slots are formed by sawing. Thus the holding power or strength of the fastener is increased. Also, due to the greater outward movement of the prongs when the expander pin is driven home a more liberal hole tolerance in the parts being held together can be allowed without reducing the holding power of the fastener.

When the slots are die-formed they need not necessarily pass completely through the fastener but each slot may, if desired, stop just short of the axis of the fastener. I prefer to form the slots so that they extend completely through the fastener at the extremity of the slotted portion thereof, thus forming individual prongs for at least a portion of the length of the fastener. I prefer to form the slots so that each slot extending radially into the fastener from the transverse outer surface thereof communicates with the other slots at the extremity of the fastener but is of less radial dimension at a point removed from the extremity of the fastener so that at such point the slots do not communicate with one another. I prefer to form each slot tapered with its maximum radial dimension equal to one-half the diameter of the slotted end of the fastener at that end, the radial dimension of the slot gradually decreasing along the fastener away from the slotted end.

I form in the end of the fastener opposite the slotted end an expander pin receiving opening. That opening extends axially into the fastener. I prefer to form the expander pin receiving opening with its inner portion intersecting the slots except at the bottom of the opening where a portion of the material of the fastener is left intact which connects together the prongs but is easily rupturable when the expander pin is driven home. Such portion prevents the prongs from spreading at any time during manufacture or heat treatment of the fastener and thus overcomes the disadvantages of prior fasteners explained above.

The fastener is preferably headed and in that case the expander pin receiving opening is formed in the head end of the fastener. The expander pin receiving opening preferably has an enlargement adjacent its mouth to receive an enlarged head of an expander pin. The expander pin in such case has an enlarged head receivable within the enlargement of the opening, the enlarged head of the expander pin being relatively narrow at its extremity and relatively wide a short distance removed from its extremity, the expander pin when driven home having said relatively wide part of its enlarged head within said enlargement of the expander pin receiving opening so that the material of the head at the mouth of said enlargement is peenable against said relatively wide part of the enlarged head of the expander pin to lock the expander pin in place.

The portion of the fastener other than the head is termed the shank, and the slots are provided in the shank at the end of the fastener opposite the head. The expander pin receiving opening extends through the head and into the shank of the fastener. The cold die-forming of the slots imparts to the slotted end of the shank the increased strength of cold work. Such increased strength increases the holding power of the fastener since the cold formed prongs are the portions of the fasteners engaging the inner face of the work to which the fastener is applied and by reason of their increased strength or hardness increasingly resist deformation under stress.

Other details, objects and advantages of the invention will become apparent as the following description of a present preferred method of practicing the same proceeds.

In the accompanying drawings I have illustrated a present preferred method of practicing the invention and have shown a present preferred form of improved expandable fastener which may be made through use of my method, in which Figure 1 is a side view of a starting blank;

Figure 1:

Referring now more particularly to the drawings, Figure 1 shows the starting blank which is designated B. It is an elongated cylindrical blank of the material of which the fastener body is to be made. The material may be metal or other material suitable for the manufacture of an expandable fastener. Fasteners of the type in question may, for example, be made of aluminum alloy, and for purposes of explanation and illustration the blank B may be considered as a solid cylindrical length of aluminum alloy such as may be produced by shearing from aluminum alloy wire. Normally the fasteners are of small size, the diameter of the cylindrical blank B being a small fraction of an inch. However, the fasteners may be made of larger size.

While the blank B is shown as being of circular cross section it may be of other cross section, as, for example, elliptical or polygonal. The cross-sectional shape of the blank is not a limitation upon the invention and expandable fasteners of the type in question may be made using blanks of various cross sections. However, for purposes of explanation and illustration the blank B will be deemed to be a right circular cylinder.

Figure 2:
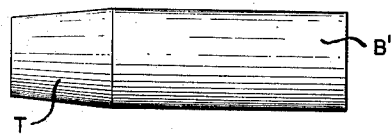
Figure 2 is a side view of the blank after the first operation which provides the blank with a zone at one end tapering to reduced transverse dimension toward that end.

The first step is to provide the blank with a zone at one end tapering to reduced transverse dimension toward that end. Figure 2 shows the blank provided with the tapered zone, the blank of Figure 2 being designated B' and the tapered zone at an end of the blank being designated T. The purpose of providing the tapered zone T is to enable the blank to be die-slotted without loss of material and so that as a consequence of the die-slotting the transverse dimension of the zone T will be increased to substantially the transverse dimension of the blank beyond that zone. The tapered zone T may be formed by a simple die-reducing operation as well known to those skilled in the art.

Figure 3:
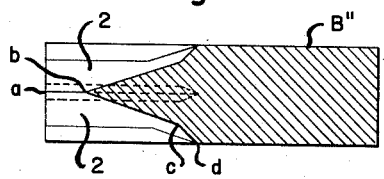
Figure 3 is an axial cross-sectional view of the blank after the second operation in which the blank is slotted.

The blank is next die-slotted. The die-slotted blank is shown in Figure 3 and is designated B''. The tapered zone T has been slotted and increased in transverse dimension to substantially the transverse dimension of the blank beyond that zone. The slots are designated by reference numeral 2. They are formed by the slotting blades shown in Figures 9 and 10 which are mounted in a die structure shown in Figure 11.

Figure 9:
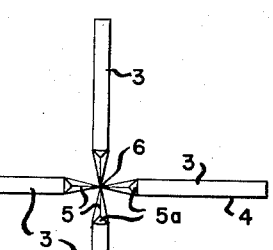
Figure 9 is an axial view of the slotting blades.
Figure 10:
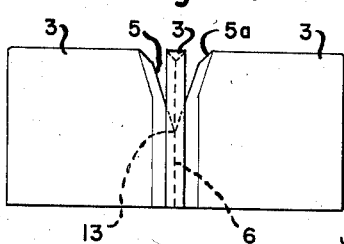
Figure 10 is a side view of the slotting blades.

As shown in Figures 9 and 10 there are four slotting blades each of which is designated 3. There may be more or less than four blades. Each of the blades has a generally planar body 4 and a tapered or sharpened forming edge having an inclined portion 5 and a portion 6 adapted to extend axially of the blank and disposed at an angle to the portion 5. At its extremity remote from the portion 6 the portion 5 of the forming edge of each slotting blade has a part of limited length designated 5a which is inclined to the portion 6 at an angle somewhat greater than the angle of inclination of the portion 5. The blades are assembled with the portions 6 of their forming edges together in line contact as shown in Figure 9 and, in the structure illustrated by way of example, with opposed blades coplanar, the blades of the respective pairs of opposed blades being at right angles as shown in Figure 9.

Figure 11:
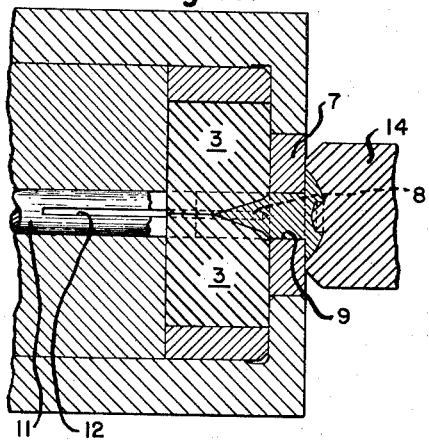
Figure 11 is a cross-sectional view through a portion of the die-forming apparatus illustrating how the blank is slotted and headed.

The blades 3 are mounted in a die structure shown in Figure 11. The die structure comprises a die member 7 provided with radial slots 8. There are four such slots at 90° intervals, the slots 8 respectively receiving the four slotting blades 3. The die member 7 serves not only to maintain the blades 3 in proper cooperative relationship but also to provide a cylindrical die cavity 9 into which the blank B' of Figure 2 is projected with the tapered zone T leading. Entering the bottom of the die cavity 9 is a cylindrical ejecting pin 11, the end of the ejecting pin 11 being provided with four slots 12 to receive the respective slotting blades 3 when ejecting the slotted blank from the die member 7.

With the die member 7 and the four slotting blades 3 assembled as above described and as illustrated in Figure 11 and with the ejecting pin 11 in the position shown in that figure the blank B' shown in Figure 2 is projected into the cylindrical die cavity 9 with the tapered zone T leading. The diameter of the cylindrical die cavity 9 is only slightly greater than the diameter of the portion of the blank B' other than the zone T so that after the zone T has passed through the mouth of the die cavity the blank is guided by the cylindrical wall of the die cavity to move axially thereinto. At the bottom of the die cavity the operative edges of the slotting blades 3 project inwardly as shown in Figure 11. As the blank B' is projected into the die cavity the zone T thereof is slotted and simultaneously expanded to increase its transverse dimension to substantially the transverse dimension of the remainder of the blank. This is done without loss of material, the space within the slots being equal in volume to the difference in volume between the portion of the blank B' at the zone T and a solid of the same length as the zone T having the same diameter as the portion of the blank B' other than the zone T.

The slotting blades form the slots 2 so that each of the slots is relatively wide at the transverse outer surface of the blank and relatively narrow inwardly of such surface. The slots extend completely through the blank at the extremity of the blank where the portions 6 of the slotting blades come together. At the point 13 indicated in Figure 10 where the portions 5 of the slotting blades meet the portions 6 the blades begin to recede outwardly and consequently the slots formed by the portions 5 and 5a of the blades are of gradually decreasing depth radially of the blank. This is clearly shown in Figure 3. In that figure each slot 2 is clearly shown as having a depth equal to the radius of the blank at the slotted end of the blank designated $a$, that depth of slot being maintained to the point $b$, whereafter each slot decreases uniformly in depth to the point $c$, whereafter each slot decreases uniformly in depth to the point $d$, the rate of decrease in depth from $c$ to $d$ being greater than the rate of decrease in depth from $b$ to $c$.

Figure 7:
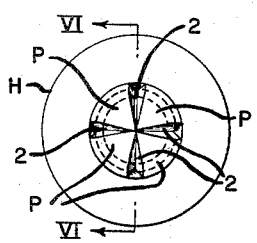
Figure 7 is an end view of the fastener shown in Figure 6 as viewed from the shank end, or the left hand end in Figure 6, before the fastener is applied.

The die-slotting has numerous advantages over the formation of slots by sawing. Not only is there a saving in material, for saw dust is entirely eliminated, but by reason of the fact that the slots are die-formed instead of being sawed they can be made of varying width as shown in Figure 7. Actually the slots are formed with pointed inner extremities which has the advantage above pointed out in increased holding efficiency of the fastener when it is applied. Also the die-slotting provides in a very simple manner for forming of the slots of varying depth as above explained. Still further, the die-forming of the slots imparts to the slotted end of the fastener the added strength of cold work which increases the holding efficiency of the fastener.

The blank B' may be forced into the die cavity 9 either by the punch member 14 shown in Figure 11, which is the heading punch, or by a separate member which does not head the blank, depending upon the material being used for manufacture of the fastener. If the blank is forced into the die cavity by a member other than the heading punch 14 the slotting occurs as a step preceding the heading step, the blank having the intermediate shape shown in Figure 3. In any event the blank is headed by the heading punch 14 as illustrated in Figure 11. This produces the slotted and headed blank B''' shown in Figure 4. The heading punch 14 forms on the end of the blank opposite the slotted end the enlarged head H and also forms in the head a cavity 15 with a tapered bottom 16. The cavity 15 above the tapered bottom 16 is substantially cylindrical as shown in Figure 4.

Figure 4:
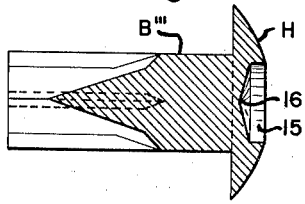
Figure 4 is an axial cross-sectional view of the blank after the third operation in which the blank is headed.

The slotted and headed blank B''' shown in Figure 4 is ejected from the die cavity 9 by the ejecting pin 11 which is operated to move toward the right viewing Figure 11, pushing the blank ahead of it, the slots 12 in the ejecting pin receiving the blades 3 as the ejecting pin moves forward.

Figure 5:
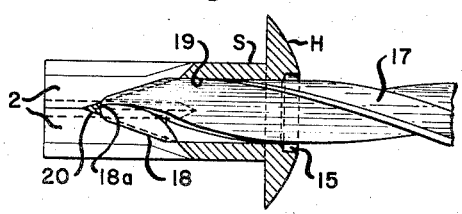
Figure 5 is an axial cross-sectional view of the blank after the fourth operation in which the expanding pin receiving opening is drilled through the headed end of the blank, the end of the drill being shown.

The slotted and headed blank is next drilled as shown in Figure 5 to provide an expander pin receiving opening. The drill used is designated 17 and has a tapered end 18 terminating in a curved nose 18a. The diameter of the drill 17 is less than the diameter of the cavity 15 as clearly shown in Figure 5. The drill 17 drills in the blank an expander pin receiving opening 19 extending through the head H and into the shank, the shank being designated S in Figure 5. The tapered bottom 16 of the cavity 15 provides a centering point for the end of the drill as is apparent from a comparison of Figures 4 and 5. The taper of the end 18 of the drill 17 is the same as the taper of the bottom of the slots from b to c as indicated in Figure 3. The drilling is continued until the expander pin receiving opening 19 intersects the slots 2 as shown in Figure 5. As soon as the expander pin receiving opening 19 has intersected the slots 2 the drilling is stopped and the drill is removed. Because of the curved or blunt nose 18a of the drill there is left an integral portion or web 20 of the material of the fastener which connects the portions of the fastener intermediate the slots 2. Those portions may be designated prongs and are marked P in Figures 6, 7 and 8. The advantages of the provision of the web 20 have been explained above.

Figure 6:
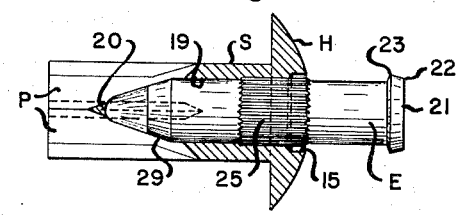
Figure 6 is an axial cross-sectional view of the finished fastener including the expander pin taken on the line VI—VI of Figure 7, the fastener as shown being ready for application but not yet applied.
Figure 8:
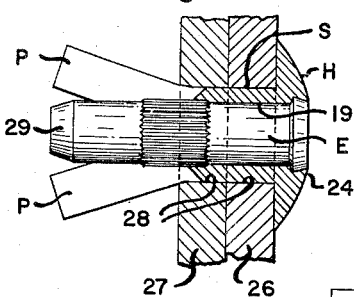
Figure 8 is a view similar to Figure 6 showing the fastener applied to fasten together two pre-drilled plates.

Figure 6 shows the completed fastener ready for application. The body of the fastener comprising the shank S and the head H slotted and drilled as above described receives an expander pin E. The expander pin E has an enlarged head 21 receivable within the cavity 15 at the mouth of the expander pin receiving opening 19. The enlarged head 21 of the expander pin E is, as shown in Figure 6, relatively narrow at its extremity and relatively wide a short distance removed from its extremity. The edge of the extremity of the head is designated 22 and the head widens from the edge 22 to the zone designated 23. The annular surface from the edge 22 to the zone 23 is inclined toward the axis of the pin E toward the right viewing Figure 6. When the pin is driven home the zone 23 lies within the cavity 15 as shown in Figure 8. This enables the material of the head H at the outer periphery of the cavity 15 to be peened over against the inclined portion of the pin between the edge 22 and the zone 23 to lock the pin in place. The peened over portion of the head is clearly shown at 24 in Figure 8 positively locking in place the expander pin E.

The expander pin E may be provided with generally axially extending spaced apart radial projections 25 adapted when the expander pin E is introduced into the body of the fastener to insure tight frictional engagement between the expander pin and the body. In this way the initial assembly of the expander pin and body as shown in Figure 6 is maintained. The fasteners may be assembled to the extent shown in Figure 6 at the factory where they are made. Also, when the expander pin is driven home the projections 25 maintain it in tight frictional engagement with the body as shown in Figure 8. Thus the projections 25 after the expander pin has been driven home act cooperatively with the peened over material at 24 to insure locking of the expander pin E in place and continued holding by the fastener of the parts which are being held together.

In Figure 8 the fastener is shown as fastening together two plates 26 and 27. The plates are assembled in face-to-face relation as shown and are pre-drilled as shown at 28, the diameter of the drilling being such as to snugly receive the shank of the fastener. The fastener with the body and expander pin assembled as shown in Figure 6 is introduced through the drilling 28 until the bottom of the head H engages the outer surface of the plate 26 as shown in Figure 8 whereupon the pin E is driven home and the material at the outer periphery of the cavity 15 is peened in as shown at 24 against the inclined edge portion of the head 21 of the expander pin to lock the expander pin in place. When the expander pin is driven home it ruptures the web 20 and spreads apart the prongs P as shown in Figure 8, thus fastening together the plates 26 and 27.

The extremity of the pin E opposite the head 21 may be formed with a tapered zone as shown at 29. The taper of the zone 29 may be the same as the taper of the inner portion of the expander pin receiving opening as formed by the end 18 of the drill 17. When the expander pin is first introduced into the body of the fastener at the factory to form the assembly as shown in Figure 6 the expander pin may be introduced until the tapered zone 29 engages the tapered inner portion of the expander pin receiving opening as shown in Figure 6. The inward taper of the slots 2 results in maximum outward movement of the prongs for the amount of material employed in manufacture of the fastener.

Thus my method of manufacture has important advantages both in economy of production and in the provision of an improved product. I utilize improved apparatus which is covered in my copending application Serial No. 578,146, filed April 13, 1956.

While I have illustrated and described a present preferred method of practicing the invention it is to be distinctly understood that the invention is not limited thereto but may be otherwise variously practiced within the scope of the following claims.

I claim:

1. A method of making an expandable fastener comprising forming in an end portion of an elongated blank a plurality of slots extending generally longitudinally of the blank, entering the blank at the side thereof and whose bottoms extend at an angle to the axis of the blank so that the slots intersect each other at the end of the blank and become less deep generally radially of the blank in the direction away from the end of the blank, drilling generally axially into the opposite end of the blank an expander pin receiving opening and terminating the drilling when the opening intersects the slots at the sides of the opening but not at the bottom of the opening, leaving at the bottom of the opening an integral web of the material of the fastener connecting the portions intermediate the slots and rupturable when an expander pin is driven home through the expander pin receiving opening to expand the portions of the fastener intermediate the slots.

2. A method of making an expandable fastener comprising providing an elongated blank with a zone at one end tapering to reduced transverse dimension toward that end, die-forming in that end of the blank a plurality of slots each extending generally longitudinally of the blank, entering the blank at the side thereof, relatively wide at the transverse outer surface of the blank and relatively narrow inwardly of such surface and relatively deep generally radially of the blank at the end of the blank and less deep generally radially of the blank at a zone removed from the end of the blnk and simultaneously with such die-forming increasing the transverse dimension of said first mentioned zone to substantially the transverse dimension of the blank beyond said zone, drilling generally axially into the opposite end of the blank an expander pin receiving opening and terminating the drilling when the openings intersects the slots at the sides of the opening but not at the bottom of the opening, leaving at the bottom of the opening an integral web of the material of the fastener connecting the portions intermediate the slots and rupturable when an expander pin is driven home through the expander pin receiving opening to expand the portions of the fastener intermediate the slots.

References Cited in the file of this patent

UNITED STATES PATENTS

| | | |
|---|---|---|
| 918,193 | Patterson | Apr. 13, 1909 |
| 1,578,172 | Retterath | Mar. 23, 1926 |
| 1,978,371 | Purtell | Oct. 23, 1934 |
| 2,006,813 | Norwood | July 2, 1935 |
| 2,146,923 | Wahlstrom | Feb. 14, 1939 |
| 2,182,092 | O'Leary | Dec. 5, 1939 |
| 2,586,336 | Huck | Feb. 19, 1952 |

FOREIGN PATENTS

| | | |
|---|---|---|
| 8,754 | Great Britain | Apr. 15, 1907 |
| 434,789 | Germany | Oct. 2, 1926 |

UNITED STATES PATENT OFFICE
CERTIFICATE OF CORRECTION

July 22, 1958

Patent No. 2,843,928

John E. Gandy

It is hereby certified that error appears in the printed specification of the above numbered patent requiring correction and that the said Letters Patent should read as corrected below.

Column 4, line 29, for "leadirng" read --leading--; column 7, line 16, for "blnk" read --blank--; column 8, line 1, for "openings" read --opening--.

Signed and sealed this 14th day of October 1958.

(SEAL)
Attest:
KARL H. AXLINE
Attesting Officer

ROBERT C. WATSON
Commissioner of Patents